United States Patent [19]
Willson et al.

[11] Patent Number: 5,413,440
[45] Date of Patent: May 9, 1995

[54] UNIT FOR MILLING AND DRILLING

[75] Inventors: Donald W. Willson, East Hartford; Donald W. Willson, II, Manchester, both of Conn.

[73] Assignee: Willson Manufacturing, Inc. of Connecticut, Manchester, Conn.

[21] Appl. No.: 220,517

[22] Filed: Mar. 31, 1994

[51] Int. Cl.[6] .................... B23C 1/06; B23B 47/28
[52] U.S. Cl. ..................... 409/235; 408/88; 408/90; 408/111; 408/234
[58] Field of Search .......... 408/20, 87, 88, 89, 408/90, 91, 103, 110, 111, 234, 236, 237; 409/211, 230, 235

[56] References Cited

U.S. PATENT DOCUMENTS

| | | | |
|---|---|---|---|
| 2,095,665 | 10/1937 | Greth | 32/67 |
| 2,413,677 | 1/1947 | Beitz | 408/88 |
| 2,616,176 | 11/1952 | Rodin | 32/67 |
| 2,629,268 | 2/1953 | Budney | 408/236 |
| 2,835,289 | 5/1958 | Rockwell | 144/1 |
| 4,118,141 | 10/1978 | Spohn, Jr. | 408/90 |
| 4,284,373 | 8/1981 | Wolff | 408/87 |

FOREIGN PATENT DOCUMENTS 3435439 11/1985 Germany .................. 408/87

OTHER PUBLICATIONS

Harnish & Reith "Prazisions-Frasgorat D-F 44".
Derquicksplit Repro-Frassockel.
K-9 Milling Installation EWL 915/990/960.
APM-Sterngold PFG 100 Milling Unit and Parallelometer.
Frasgerat AF 30 Machine AF 30 Universelle AF 30.

*Primary Examiner*—Daniel W. Howell
*Attorney, Agent, or Firm*—Ira S. Dorman

[57] ABSTRACT

A milling and drilling unit utilizes a stiff arm and a articulated arm, both arms being supported on an upright post and each being fitted with a clamping member that is capable of engaging bodies of substantial cross-sectional variation. The arms can be raised and lowered on a rack, using a meshing pinion that is operated from either side of the unit, and they are capable of rotation about the supporting post when lowered sufficiently to disengage the rack-and-pinion mechanism; clamping levers serve to fix the arms in selected vertical positions.

3 Claims, 6 Drawing Sheets

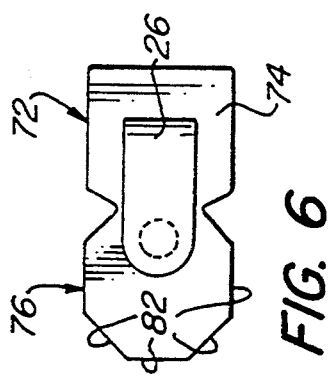
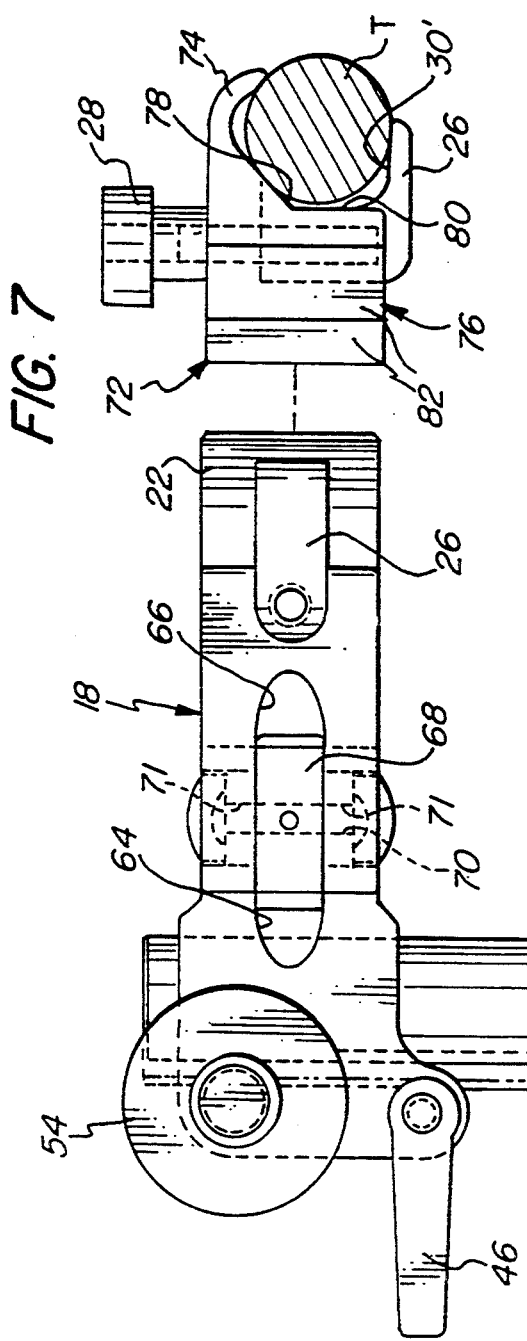
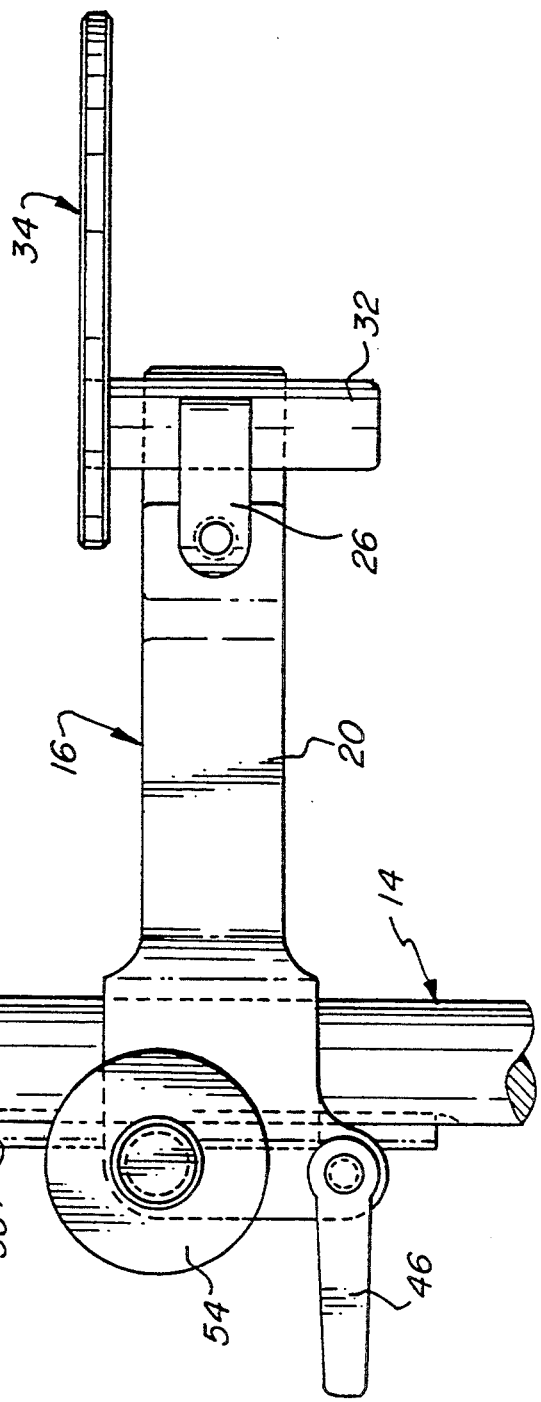

UNIT FOR MILLING AND DRILLING

BACKGROUND OF THE INVENTION

Milling and drilling units, employed for supporting spindles and other power tools, are in widespread use especially in dental laboratories and like facilities. Various forms of such apparatus are commercially available and are disclosed in the prior art, exemplary of which are the following U.S. Pat. Nos.:

Greth U.S. Pat. No. 2,095,665 discloses a machine for dental applications, which incorporates an upper, transversing arm assembly and a lower adjustable arm.

Rodin U.S. Pat. No. 2,616,176 shows mounting of the arm of a dental machine on a rack for vertical adjustment.

Rockwell, U.S. Pat. No. 2,835,289 shows an integral, adjustable work-supporting table.

Thus, there is thought to be a need for a milling and drilling unit that offers enhanced flexibility and universality of application and use, and that is at the same time facile to employ and relatively inexpensive to manufacture. Accordingly, it is the broad object of the present invention to provide apparatus affording the foregoing features and advantages.

More specific objects are to provide such apparatus in which powered, normally hand-held tools of various kinds and sizes can readily and securely be supported in a multitude of different positions and attitudes, which positions and attitudes can be changed readily and with a high degree of control and stability.

SUMMARY OF THE INVENTION

It has now been found that certain of the foregoing and related objects of the invention are attained by the provision of a unit comprising a base, an elongate post of generally circular cross section affixed at one end to the base in a normally upright attitude, and first and second arms. Both of the arms are supported for longitudinal movement on the post; the first will normally be rigid and of fixed configuration, whereas the second will be articulated. Clamping means defines an opening of variable effective cross section at one end of each arm, for receiving and clampingly engaging bodies of a substantial range of different sizes, and post-engaging means, provided at the other end, comprises a mounting part having an axial passage for slidably receiving the post. A toothed rack is spaced upwardly from the base and extends longitudinally on the post, and is engaged by a pinion on the mounting part of each arm to effect raising and lowering. The mounting part of at least one of the arms will be of sufficiently small axial length to pass between the base and the rack, thus enabling rotation of the arm when its mounting part is disposed over the lower section of the post, and means is provided for securing each arm at any selected level.

The clamping means of at least one of the arms will preferably comprise a fixed jaw and a movable jaw, with the opening therethrough being partially defined by two adjacent, angularly disposed flat surfaces. A mounting fixture may additionally be provided, the fixture being comprised of a clamping part defining an opening of variable effective cross section, and an engagement part having a multiplicity of flat, mutually adjacent surfaces disposed at the same angle as the surfaces of the clamping means. This will enable seating of the engagement part in the opening of the clamping means in a plurality of different angular orientations, with respective flat surfaces bearing upon one another in each orientation. The mounting and clamping parts of the fixture are also so interrelated as to enable support of a body in a horizontal, rather than vertical, orientation.

BRIEF DESCRIPTION OF THE DRAWINGS

FIG. 6 is an elevational view of a mounting fixture suitable for use in the unit of the invention; and FIG. 7 is a fragmentary side elevational view, with the fixture of FIG. 6 shown rotated 90° therefrom about its longitudinal axis and in exploded relationship to the unit.

DETAILED DESCRIPTION OF THE ILLUSTRATED EMBODIMENTS

Figure 1:
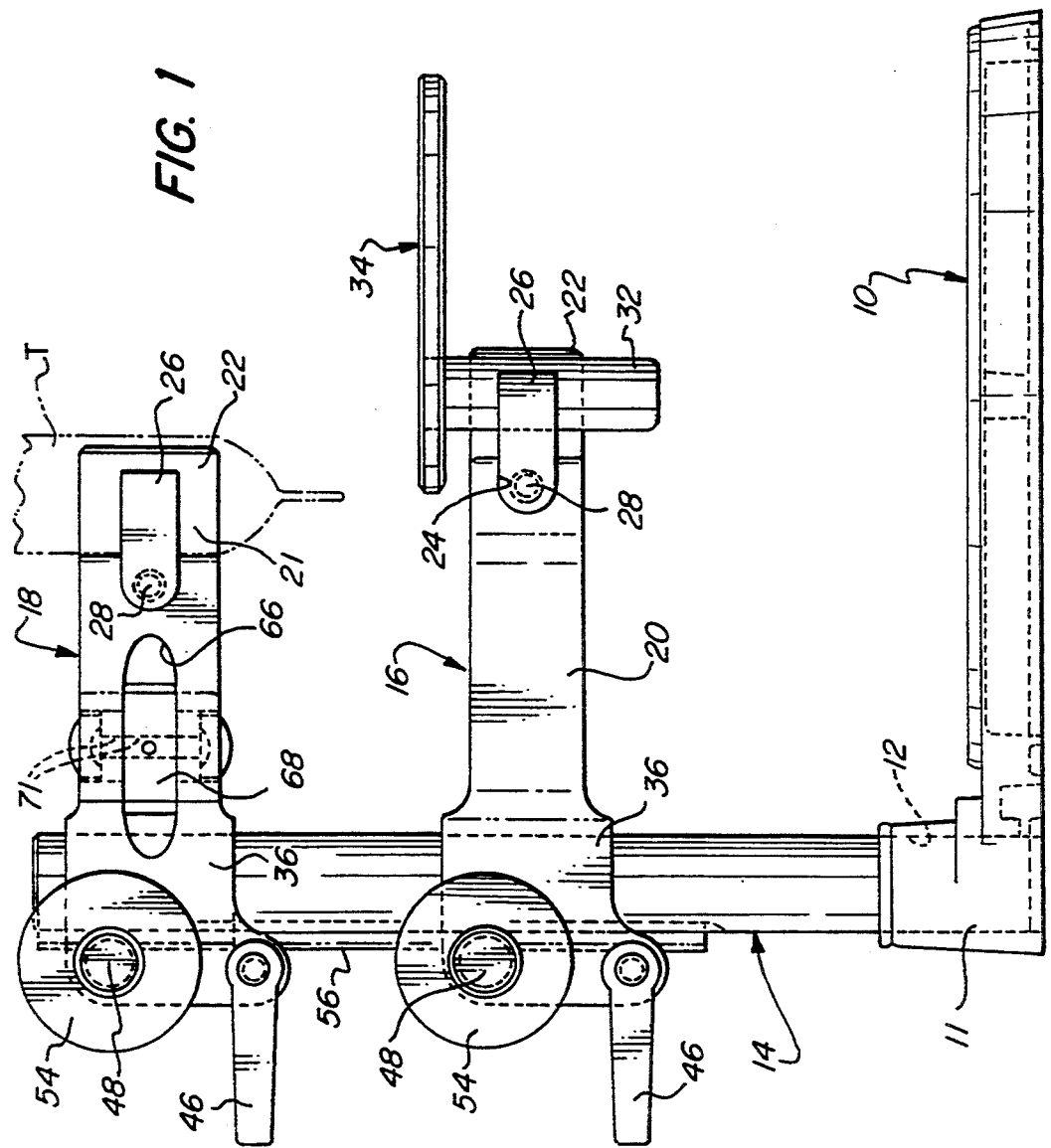
FIG. 1 is a side elevational view of a milling and drilling unit embodying the present invention, showing in phantom line a normally hand-held power tool supported thereby.
Figure 2:
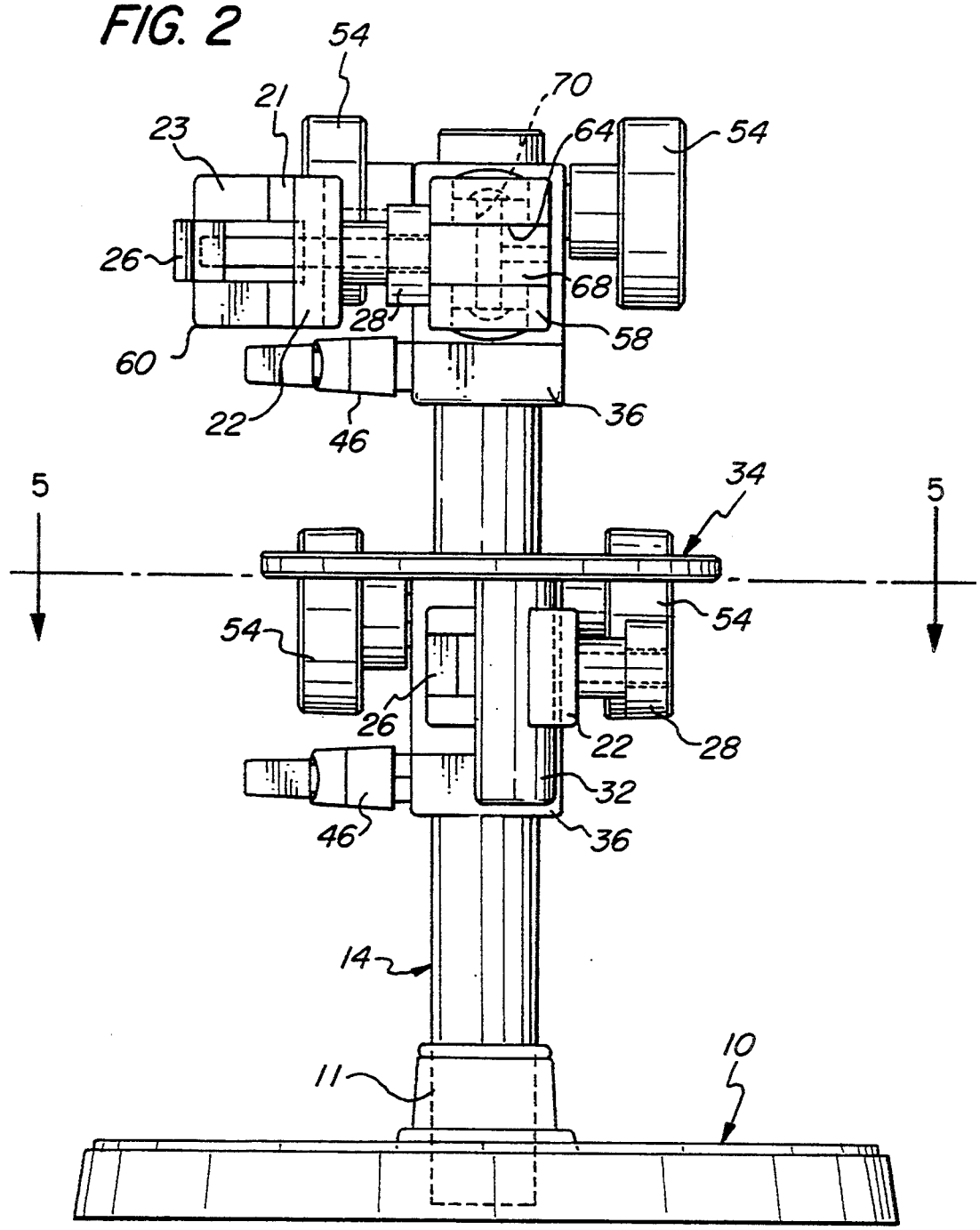
FIG. 2 is a front elevational view of the unit illustrated in FIG. 1.

Turning now in detail to the appended drawings, the unit of the invention is seen to consist of a circular base, generally designated by the numeral 10, having a rearwardly disposed hub 11 in which a socket 12 is formed. The socket seats and engages the lower end of an upright circular post, generally designed by the numeral 14, on which are mounted, in coaxial relationship, a rigid or "stiff" arm of fixed configuration, generally designated by the numeral 16, and an articulated arm generally designated by the numeral 18.

The arm 16 comprises an intermediate portion 20 and a forward end portion, the latter being formed as a fixed jaw 22 having contiguous flat surfaces 21 and 23 disposed thereon at an angle of 135°, and having a slot 24 extending inwardly from one side thereof. A movable jaw 26 is slidably received in the slot 24, and a thumb screw 28 has its shaft engaged in a threaded aperture for generating clamping force throughout the full range of the effective area of the opening 30 through the clamping portion. The circular table, generally designated by the numeral 34, has a depending post 32 received in the opening 30 and clamped in position between the jaws 22 and 26.

Figure 3:
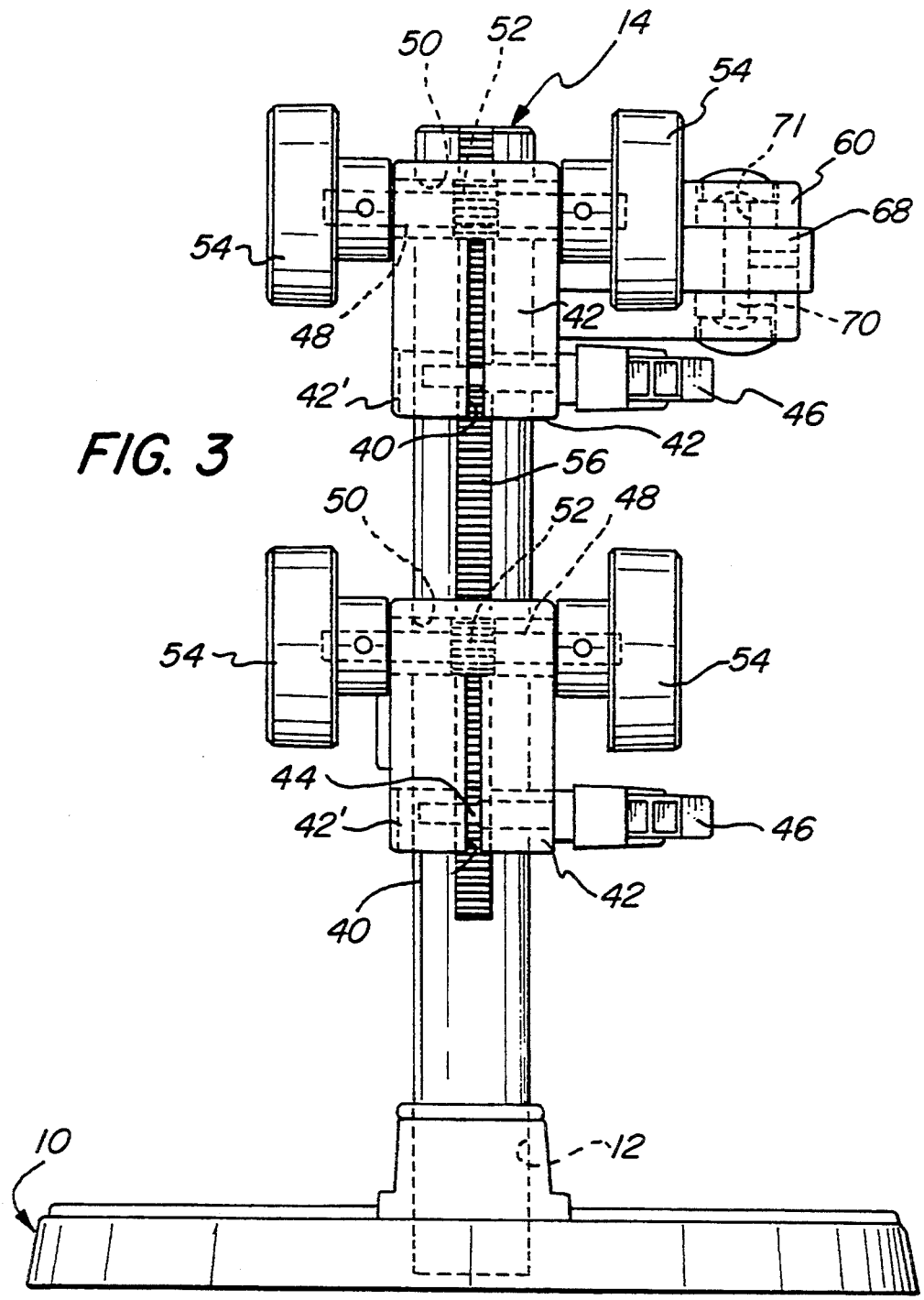
FIG. 3 is a rear elevational view of the unit.
Figure 4:
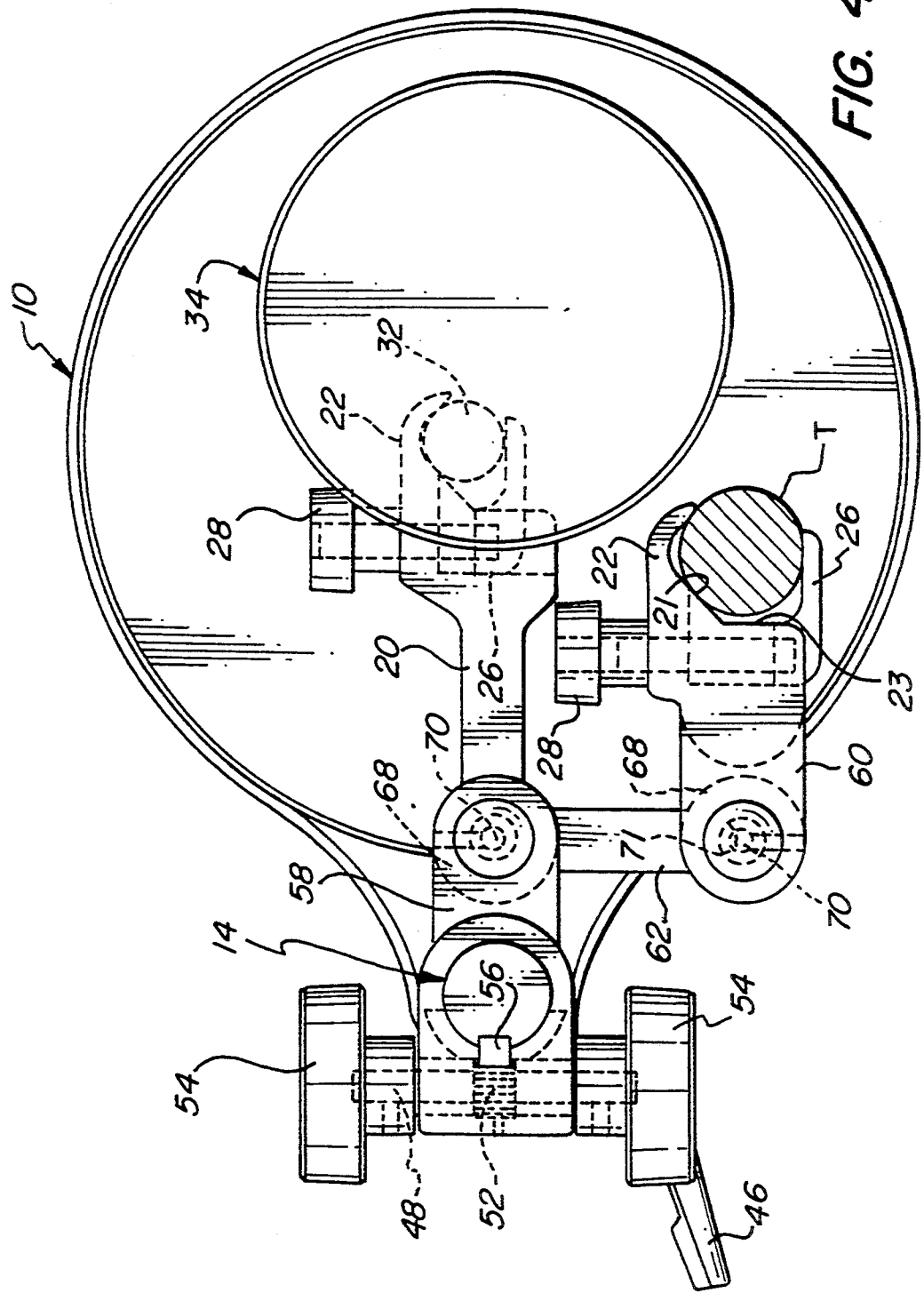
FIG. 4 is a plan view of the unit.
Figure 5:
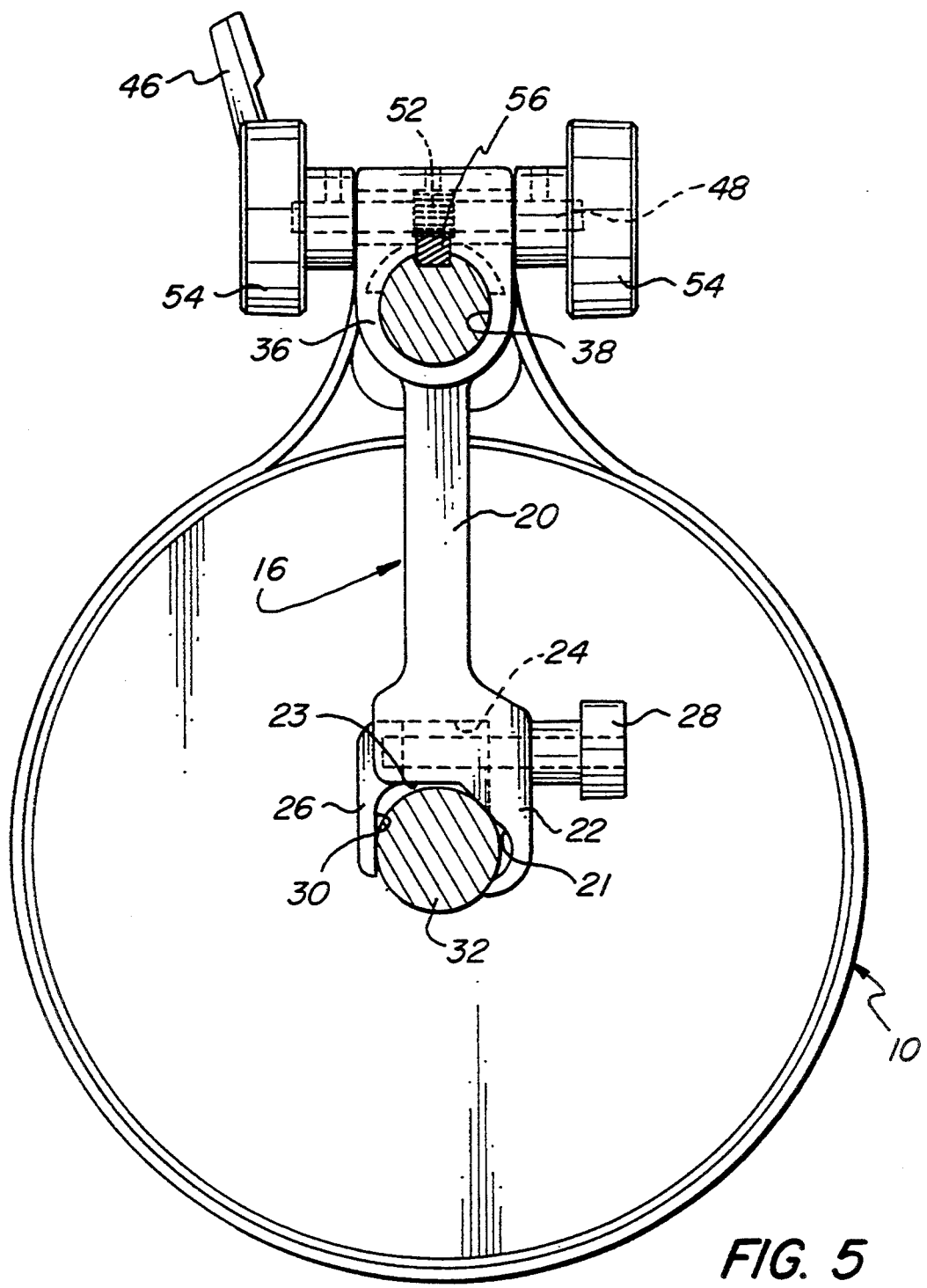
FIG. 5 is an essentially plan view of the unit, taken substantially along line 5—5 of FIG. 2.

A mounting collar portion 36 is formed at the opposite end of arm 16, which defines a circular passage 38 through which the post 14 extends. As best seen in FIG. 3, the back of the collar 36 is partially split at 40 to thereby form yieldable fingers 42, 42'. The shaft 44 of a clamping lever 46 spans the split 40, and has a threaded end portion engaged in the finger 42'; turning the handle of the lever 46 will draw the fingers together, thereby exerting clamping force upon the shaft 14 to fix the arm 16 at any selected level.

A second shaft 48 extends through a passageway 50 formed in an upper part of the collar portion 36, and has a pinion 52 affixed centrally thereon and operating knobs 54 attached to its opposite ends. A rack 56 extends along the back of the post 14 and is engaged by the pinion 52, thus enabling raising and lowering of the arm 16 in a precise and controlled manner, by rotation of either knob 54.

The mounting means and clamping means provided on the articulated arm 18, as well as the clamping and elevation features thereof, are the same as on the stiff arm 16 and need not therefore be further described; parts common thereto are designated by common numbers. The forward component 60 of the arm 18 (having fixed jaw 22 and movable jaw 26 thereon) has a transverse opening 66 therethrough, in which is received the circular hub portion 68 formed on one end of the link component 62; a second hub portion 68, formed on the opposite end of the link component 62, is received in a similar opening 64 of the mounting component 58. The link component 62 is pivotably attached to the components 58 and 60 by fasteners 70, which extend through suitable apertures 71.

It will be appreciated therefore that either of the arms 16, 18 can be utilized to support a tool T (as shown fragmentarily in phantom line in FIG. 1) or a body such as table 34. Typically, the table 34 would be utilized on the stiff arm 16 to support a workpiece or as a rest for the hand of an operator, with a drill or milling tool being held by the articulated arm 18.

FIG. 6 shows a supplemental mounting fixture adapted for use with either arm of the unit of the invention. Its function is to orient a supported tool T or other body in a horizontal rather than vertical attitude, and also to allow different orientations of the body relative to the longitudinal axis of the clamping component 60.

The fixture consists of a clamping portion, generally designated by the numeral 72 and having a fixed jaw element 74, and a mounting portion generally designated by the numeral 76. Adjacent flat interior surfaces 78 and 80 are formed on the fixed jaw 74, and are comparable to the surfaces 21, 23 on the jaws 22.

The mounting portion 76 is also formed with flat surfaces 82, which are mutually adjacent and parallel and extend in planes to which the axis of the opening 30', defined between the jaws 26, 74, is perpendicular. Being of essentially octagonal cross section, adjacent surfaces 82 on the portion 76 are disposed at an angle of 135° relative to one another, and are therefore disposed to mate with the surfaces 21 and 23. Consequently, the supplemental fixture can be mounted in the clamping means of either arm in each of three orientations, with two of the surfaces 82 bearing directly upon the surfaces 21 and 23 and with the inside surface of the movable jaw 26 bearing directly upon a third surface 82. This will of course establish a very secure mounting of the fixture, with its opening 30' selectively oriented as described above.

Although the rack and pinion arrangement will normally constrain each of the arms to a single radial orientation on the post 14, the mounting portions 36 are of such axial length, relative to the space between the hub 11 and end of the rack 36, as to permit rotation of an arm about the post when it is lowered sufficiently to disengage it from the rack 56. This of course affords an additional degree of movement and orientation, further enhancing the flexibility of use and application of the unit.

Because of the wide travel range of the jaw 26, a high degree of variation in the cross section of the opening 30 is possible, in turn enabling use of both arms with bodies of diverse shapes and sizes. The unit offers enhanced flexibility and universality of application, as compared to prior art units of a similar nature, and is nevertheless facile to employ and relatively inexpensive to manufacture. In addition, normally hand-held tools of various kinds and dimensions can readily and securely be supported by the unit in a multitude of different positions and attitudes, which positions and attitudes can be changed readily and with a high degree of control and stability.

Having thus described the invention, what is claimed is:

1. A unit for the support of power tools and the like, comprising:
    a base;
    an elongate post affixed at one end to said base in a normally upright attitude, said post having a toothed rack spaced upwardly from said base and extending longitudinally thereon, and said post being of generally circular cross section, at least in a lower section of its length lying between said base and said rack;
    a first rigid arm supported for longitudinal movement on said post; and
    a second, articulated arm supported for longitudinal movement on said post; both of said arms having opposite end portions with clamping means and post-engaging means thereon, respectively; said clamping means defining an opening of variable effective cross section for receiving and clampingly engaging therein bodies of different sizes; and said post-engaging means comprising a mounting part having an axial passage therethrough for slidably receiving said post, a pinion mounted on said mounting part and operatively engageable with said rack for raising and lowering the associated arm, and securing means for securing said associated arm at selected levels on said post, said mounting part of at least one of said arms being of sufficiently small axial length to pass between said base and said rack and said passage therethrough being of generally circular cross section, said one arm thereby being rotatable on said post with said mounting part and said base section thereof, respectively, in mutual registration.

2. The unit of claim 1 wherein said clamping means of at least one of said arms comprises a fixed jaw and a movable jaw, and wherein at least one of said jaws has two substantially flat surfaces adjacently disposed thereon with a selected obtuse angle therebetween, and partially defining said opening through said clamping means.

3. The unit of claim 1 additionally including a mounting fixture having first and second opposite end portion comprising a clamping part and an engagement part, respectively, said clamping part defining, on a first axis, an opening of variable effective cross section for receiving and clampingly engaging therein bodies of different sizes, and said engagement part having a multiplicity of substantially flat surfaces mutually adjacently disposed thereon with said selected obtuse angle therebetween and extending in planes parallel to said first axis, said engagement part being dimensioned for seated engagement within said opening of said clamping means of said one arm in a plurality of different angular orientations with two of said surfaces of said engagement part bearing upon said two surfaces of said one jaw in each of said orientations.

* * * * *